United States Patent

[11] 3,603,648

| [72] | Inventors | Raymond A. Reznicek;<br>Gerald L. Kretchman; Samuel E. Stone, all of St. Joseph, Mich. |
|---|---|---|
| [21] | Appl. No. | 855,960 |
| [22] | Filed | Sept. 8, 1969 |
| [45] | Patented | Sept. 7, 1971 |
| [73] | Assignee | The Bendix Corporation |

[54] DOUBLE-ACTING SEAL FOR METERING VALVE
2 Claims, 2 Drawing Figs.

[52] U.S. Cl. .................................................. 303/6 C,
60/54.5 E, 137/512.2, 188/349
[51] Int. Cl. ..................................................... B60t 11/34,
B60t 8/26
[50] Field of Search .......................................... 137/512.2,
512.3; 188/152, 152.11; 60/54.5; 303/6, 6 C

[56] References Cited
UNITED STATES PATENTS

| 3,375,852 | 4/1968 | Milster | 303/6 |
| 3,385,637 | 5/1968 | Kersting | 303/6 |
| 3,462,201 | 8/1969 | Lewis et al. | 303/6 |
| 3,480,333 | 11/1969 | Stelzer | 303/6 |
| 3,394,546 | 7/1968 | Stelzer | 303/6 X |
| 3,499,688 | 3/1970 | Reynolds | 137/512.2 |

Primary Examiner—Milton Buchler
Assistant Examiner—John J. McLaughlin
Attorneys—C. F. Arens and Plante, Arens, Hartz, Hix and Smith ABSTRACT: A metering valve is interposed between the master cylinder and the disc brakes of a braking system employing both disc and drum brakes. The valve permits fluid communication between the master cylinder and the disc brakes until a first predetermined level of pressure is reached whereupon the fluid communication is terminated until a still higher lever of fluid pressure is achieved, whereupon the valve is fully open.

PATENTED SEP 7 1971

3,603,648

INVENTORS
RAYMOND A. REZNICEK
GERALD L. KRETCHMAN
SAMUEL E. STONE

BY:
Plante, Arens, Hartz, Hix and Smith
ATTORNEYS

DOUBLE-ACTING SEAL FOR METERING VALVE

BACKGROUND OF THE INVENTION

This invention relates to a fluid pressure metering valve for a vehicular hydraulic brake system.

In vehicular braking systems employing disc brakes on the front wheels and drum brakes on the rear wheels, a problem arises due to the fact that the disc brakes develop a relatively high braking torque when the brakes are lightly applied. On the other hand, the rear drum brakes employ return springs, the force of which must be overcome before any braking torque at all is applied to the rear wheels. Therefore, it is desirable to provide a valve in the front brake lines that retards delivery of fluid pressure to the disc brakes until the rear wheel cylinders overcome the force of the return springs. The valve then opens to permit fluid pressure to reach the disc brakes on the front wheels.

SUMMARY OF THE INVENTION

Therefore, an important object of our invention is to provide a fluid pressure metering valve having substantially fewer components than existing valves thereby reducing manufacturing costs.

Another important object of our invention is to simplify and improve the seals between the various valve members.

Still another important object of our invention is to provide smoother operation and increased durability of a metering valve by decreasing the amount of required deformation of the various springs used in the valve.

Yet another important object of my invention is to provide a metering valve having a pair of valve members, one of which carries a spring that yieldably urges the other valve member away from the one valve member.

DRAWING DESCRIPTION

FIG. 1 is a schematic view of a brake system with a cross-sectional view of a metering valve made pursuant to the teachings of my invention; and FIG. 2 is a cross-sectional view taken substantially along line 2—2 of FIG. 1.

DETAILED DESCRIPTION

Figures 1, 2:
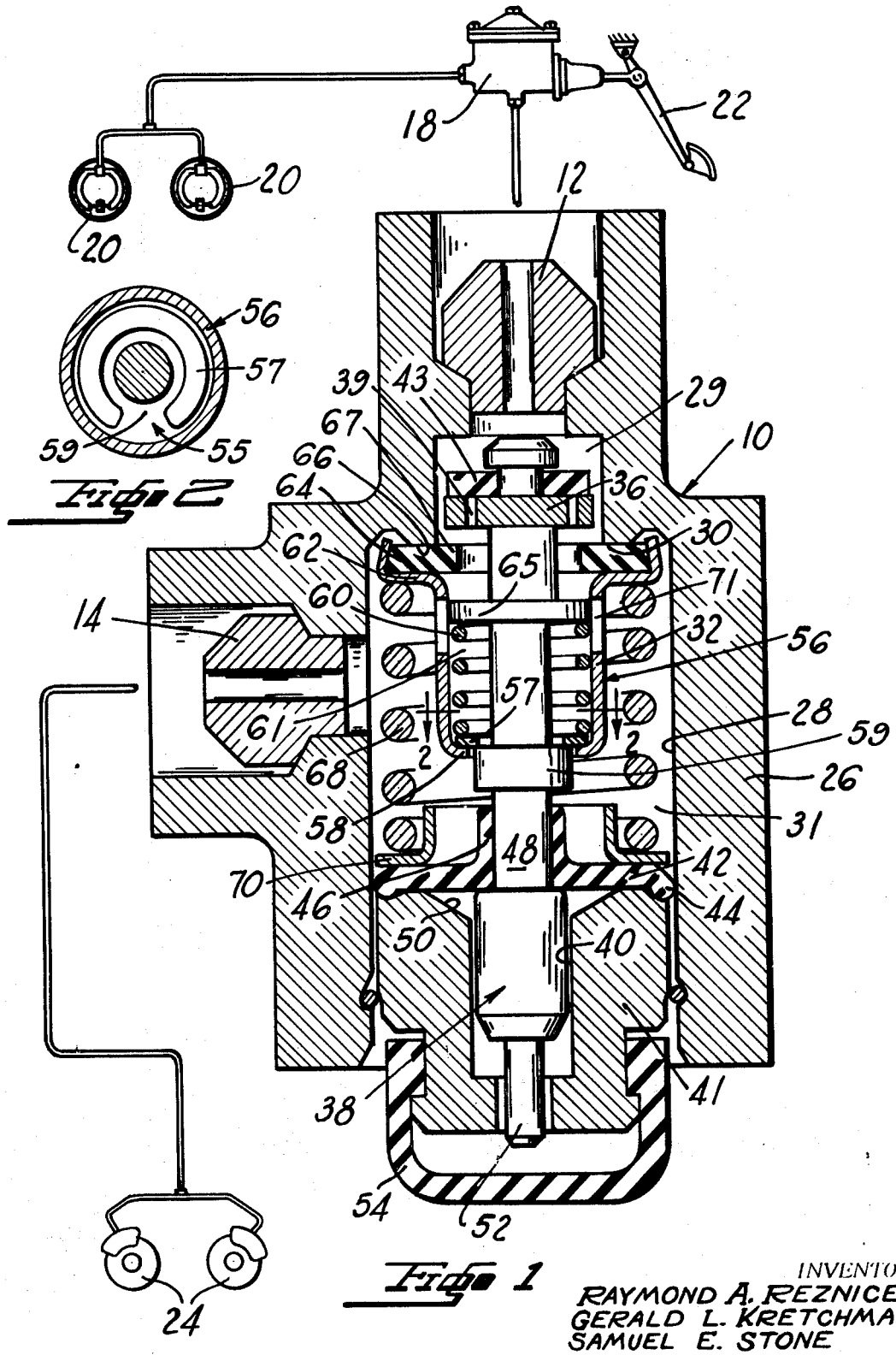

Referring now to the drawings, a metering valve 10 includes an inlet 12 and an outlet 14. Fluid under pressure is delivered to the inlet 12 from one side of a split master cylinder 18, the other side of which is connected directly to drum brakes 20 on the rear wheels. Fluid pressure is developed in master cylinder 18 in the normal manner by depressing a pedal 22 located in the vehicle operator's compartment. The outlet 14 of the valve 10 is connected to the disc brakes 24 on the front wheels of the vehicle.

Valve 10 further includes a housing 26 defining a bore 28 therewithin communicating the inlet 12 with the outlet 14. An annular valve seat area 30 on the housing 26 in the bore 28 circumscribes the inlet 12. First and second coaxial valve members 32 and 38 are arranged for slidable movement in the bore 28, dividing the latter into an inlet chamber 29 and an outlet chamber 31, and are also slidable relative to each other. A valve head 36 is carried on one end of the valve member 38, and the other end of the member 38 is slidably received in a bore 40 in a plug 41 that closes the bore 28. Circumferentially spaced passages 39 extend through the valve head 36 and are normally closed by an annular resilient washer 43 secured to the valve stem 38 about the inner periphery of the washer. An annular resilient diaphragm 42 has an outer periphery 44 sealingly engaging the bore 28 and an inner peripheral portion 46 sealingly engaging a stepped section 48 on the member 38. Plug 41 has an inclined surface 50 circumscribing the bore 40 to accommodate the diaphragm 42 during downward movement of the valve member 38. End 52 of the member 38 projects from the housing 26 and is covered by a boot 54 to exclude contaminants from the area encompassing the bore 40 in the plug 41 in which the valve member 38 moves. By depressing the end 52, a mechanic may hold the valve 10 open when the brake lines are bled.

The first valve member 32 includes an annular section 56 provided with circumferentially spaced openings 71 extending therethrough. The annular section 56 has a diameter substantially larger than that of the valve member 38 which is telescopingly received by the valve member 32. A radially inwardly projecting lip 58 extends from the lowermost part of the section 56. A C-shaped washer 57 is supported by the lip 58 and an enlarged portion 59 on the stem 38. The C-shaped washer 57 presents an opening 55 in the circumference thereof, which enables the washer to be inserted onto the member 38 during assembly of the valve, and also provides a path for fluid to flow through the washer 57. A coiled spring 60 is disposed in the chamber 61 between the washer 57 and a shoulder 65 on the valve member 38 to yieldably bias the latter from the valve member 32. Valve member 32 further includes a radially outwardly projecting, circumferentially extending section 62 that projects from the annular section 56 and underlies the valve seat area 30 and the valve head 36. A ring 64 of resilient material is secured to one side of the section 62 and has an outer portion 66 adapted to engage the valve seat area 30 and an inner portion 67 adapted to be engaged by the valve head 36. A spring 68 engages the underside of the section 62 and a reinforcing ring 70 on the diaphragm 42 to yieldably bias the valve member 32 into engagement with the valve seat area 30.

MODE OF OPERATION

FIG. 1 illustrates the valve 10 in the brake release position. When the vehicle operator depresses the pedal 22, fluid pressure is developed in the master cylinder 18. Fluid enters the inlet 12 of the valve 10, flows around the valve head 36, through the chamber 61 and the openings 71 and 55 to the outlet chamber 31 and then through the outlet 14 to the disc brakes 24. As the vehicle operator continues to depress the pedal 24, pressure in the valve 10 increases until the fluid force acting on the unsupported area of diaphragm 44 forces the latter downwardly toward the inclined surface 50, thus forcing the stem 38 downwardly in the bore 26 against the bias of the spring 60 until the valve head 36 is driven into sealing engagement with the resilient ring 64 to discontinue fluid communication between the inlet and outlet. As fluid pressure in the inlet chamber 29 is increased still further, a state will be reached in which the force due to fluid pressure in the inlet chamber 29 acting on the valve members 32 and 38 will be sufficient to overcome the resiliency of the spring 68 to drive the ring 64 from the valve seat area 30 to permit fluid communication between the inlet and outlet. The valve is momentarily open in this position permitting flow of fluid from the inlet to the outlet until the pressure differential between inlet and outlet chambers 29 and 31 is reduced to a value permitting the spring 68 to force the valve member 32 into engagement with the valve seat area 30 to terminate fluid communication between the inlet and outlet. Subsequent increases in fluid pressure at the inlet will result in continued opening and closing of the valve as fluid pressure at the inlet and the outlet increases. When the force due to fluid pressure in chamber 31 acting on the diaphragm 42 tending to force the latter downwardly exceeds the force of the spring 68, the diaphragm 42 will engage the inclined surface 50 thus holding the valve member 38 in its downwardmost position. Due to the engagement of the head 36 with the ring 64, when the stem 38 is in its downwardmost position the ring 64 will be held spaced from the valve seat area 30. At this time, the valve 10 is fully open, permitting fluid to flow freely from the inlet to the outlet.

When the vehicle operator decreases pressure on the pedal 22 resulting in a decrease in pressure in the inlet chamber 29, fluid flows from the outlet to the inlet around the outer periphery of the valve member 32 until the pressure in the valve 10 is reduced sufficiently to permit the spring 68 to bias the valve member 32 into engagement with the seat 30. Since the pressure in the inlet chamber 29 is still less than the pressure in the outlet chamber 31, the higher pressure in the latter acting through the passages 39 will lift the resilient washer 43 off the passages 39 to permit fluid flow through the latter, thereby reducing pressure in the outlet chamber still further. When the pressure in the valve 10 is reduced below the force exerted by the spring 60, the valve head 36 is forced from the ring 64. The valve members 32 and 38 are then in the brake released position as illustrated in the drawing.

We claim:
1. In a fluid control device:
   a housing having an inlet, an outlet, and a bore communicating the inlet with the outlet;
   a valve seat area on said housing in said bore;
   first and second relatively movable coaxial valve members reciprocable in said bore dividing the latter into an inlet chamber and an outlet chamber;
   first resilient means yieldably biasing said first valve member into engagement with said valve seat area; and
   second resilient means carried by said first valve member yieldably biasing said second valve member from said first valve member whereby fluid communication between the inlet and outlet chambers is permitted until a predetermined level of fluid pressure in said inlet chamber overcomes the bias of said second resilient means to drive said second valve member into sealing engagement with said first valve member whereupon fluid communication between the chambers is terminated until a second predetermined pressure is achieved sufficient to overcome the bias of said first resilient means to drive said first valve member from said valve seat area to permit fluid communication between the chambers;
   said first valve member having an annular section telescopingly receiving said second valve member and a second projecting radially outwardly from said annular section;
   said outwardly projecting section being adapted to engage said valve seat area;
   said annular section having a diameter substantially larger than said second valve member to define an annular chamber between said annular section and said second valve member;
   said second resilient means being a coiled spring disposed in said annular chamber;
   said second valve member including a valve stem having larger and smaller diameter portions presenting a shoulder therebetween;
   said annular section having a radially inwardly projecting lip;
   said spring operatively interconnecting said lip and said shoulder.
2. The invention of claim 1; and
   a washer engaging said lip and said stem;
   said spring engaging said washer;
   said washer having an axially extending fluid passage formed therein.